(12) United States Patent
Ishihara et al.

(10) Patent No.: US 11,520,081 B2
(45) Date of Patent: Dec. 6, 2022

(54) FLOOD DETECTION DEVICE, FLOOD DETECTION SYSTEM, FLOOD DETECTION PROGRAM STORAGE MEDIUM, AND FLOOD DETECTION METHOD

(71) Applicant: TOYOTA JIDOSHA KABUSHIKI KAISHA, Toyota (JP)

(72) Inventors: Naoki Ishihara, Chiyoda-ku (JP);
Hideki Kawai, Chiyoda-ku (JP);
Takayuki Yamabe, Chiyoda-ku (JP);
Yuichiro Nishi, Nerima-ku (JP);
Hiroyuki Yano, Mihama-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/018,896

(22) Filed: Sep. 11, 2020

(65) Prior Publication Data

US 2021/0080616 A1   Mar. 18, 2021

(30) Foreign Application Priority Data

Sep. 13, 2019   (JP) .............................. JP2019-167664

(51) Int. Cl.
*G01W 1/14*   (2006.01)
*G01W 1/10*   (2006.01)

(52) U.S. Cl.
CPC ................ *G01W 1/14* (2013.01); *G01W 1/10* (2013.01)

(58) Field of Classification Search
CPC ...................................................... G01W 1/14
USPC ............................................................ 702/3
See application file for complete search history.

(56) References Cited

U.S. PATENT DOCUMENTS

| 2011/0029243 | A1* | 2/2011 | Gallagher | G01W 1/00 |
| | | | | 702/3 |
| 2011/0043377 | A1* | 2/2011 | McGrath | G06V 20/52 |
| | | | | 340/905 |
| 2014/0081573 | A1* | 3/2014 | Urmson | G01S 17/95 |
| | | | | 702/3 |
| 2017/0015329 | A1* | 1/2017 | Furukawa | B60W 40/06 |

(Continued)

FOREIGN PATENT DOCUMENTS

| JP | 2004-341795 A | 12/2004 |
| JP | 2011/185838 A | 9/2011 |
| JP | 2012-216103 A | 11/2012 |

(Continued)

*Primary Examiner* — Ricky Go
(74) *Attorney, Agent, or Firm* — Oblon, McClelland, Maier & Neustadt, L.L.P.

(57) ABSTRACT

A flood detection device includes a detection result acquisition section, a weather information acquisition section and an identification section. The detection result acquisition section acquires a detection result that, on the basis of a plurality of kinds of running state data relating to running of a vehicle, detects flooding of a road on which the vehicle is running. The weather information acquisition section acquires weather information including at least one of rainfall information representing a measured rainfall amount in a region in which the vehicle is running or rainfall estimation information representing an estimated rainfall amount. The identification section uses the respective acquisition results of the detection result acquisition section and the weather information acquisition section to identify flooding of the road.

13 Claims, 12 Drawing Sheets

(56) References Cited

U.S. PATENT DOCUMENTS

2019/0217864 A1* 7/2019 Kusukame .............. G01W 1/02
2020/0192403 A1* 6/2020 Silver ................... B60W 30/02

FOREIGN PATENT DOCUMENTS

| JP | 2015-207106 A | 11/2015 |
| JP | 2016/103267 A | 6/2016 |
| JP | 2017-024460 A | 2/2017 |
| JP | 2007-051974 A | 3/2017 |

* cited by examiner

FIG.3

| VEHICLE TYPE ID | C1 | C21 | C22 | C23 | C24 |
|---|---|---|---|---|---|
| a | C1_a | C21_a | C22_a | C23_a | C24_a |
| b | C1_b | C21_b | C22_b | C23_b | C24_b |
| c | C1_c | C21_c | C22_c | C23_c | C24_c |

FLOOD DETECTION DEVICE, FLOOD DETECTION SYSTEM, FLOOD DETECTION PROGRAM STORAGE MEDIUM, AND FLOOD DETECTION METHOD

CROSS-REFERENCE TO RELATED APPLICATION

This application is based on and claims priority under 35 USC 119 from Japanese Patent Application No. 2019-167664 filed on Sep. 13, 2019, the disclosure of which is incorporated by reference herein.

BACKGROUND

Technical Field

The present disclosure relates to a flood detection device, a flood detection system, a flood detection program storage medium, and a flood detection method.

Related Art

A road may be flooded by a large quantity of rainfall, an inflow of rainwater that has fallen in another location or the like. Technologies that detect this flooding of a road include technologies proposed in, for example, Japanese Patent Application Laid-Open (JP-A) Nos. 2004-341795 and 2012-216103.

JP-A No. 2004-341795 proposes equipping, in the vehicle, a vehicle with a flood sensor configured to be capable of detecting the presence of a liquid substance, detecting flooding of roads, transmitting detection results to a server in a center, and specifying a route that does not pass through an impassable flood and providing with another vehicle guidance for the diverted route.

JP-A No. 2012-216103 proposes estimating a rainfall amount of a location a vehicle is running through on the basis of a wiping speed and operation duration of a wiper of the vehicle, and estimating whether or not there is flooding in a running route on the basis of estimated rainfall amounts provided from other vehicles.

However, the technology of JP-A No. 2004-341795 requires a rainfall sensor, and there is scope for improvement in more easily assessing flooding.

With the technology of JP-A No. 2012-216103, not all drivers necessarily operate wipers at the same wiper speeds for the same rainfall amounts, and there is scope for improvement in accurately identifying flooding.

SUMMARY

The present disclosure is made in consideration of the circumstances described above and provides a flood detection device, a flood detection system, a flood detection program storage medium, and a flood detection method that may identify flooding of a road simply and accurately.

A first aspect of the present disclosure is a flood detection device including: a detection result acquisition section that acquires a detection result detecting flooding of a road on which a vehicle is running, on the basis of plural kinds of running state data relating to the running of the vehicle; a weather information acquisition section that acquires weather information including at least one of rainfall information representing a measured rainfall amount in a region in which the vehicle is running, or rainfall estimation information representing an estimated rainfall amount; and an identification section that identifies flooding of the road by using the acquisition results of the detection result acquisition section and the weather information acquisition section.

According to the first aspect, on the basis of the plural kinds of running state data relating to the running of the vehicle, the detection result acquisition section acquires the detection result detecting flooding of the road on which the vehicle is running.

The weather information acquisition section acquires the weather information that includes at least one of the rainfall information representing measured rainfall amounts in the region in which the vehicle is running or the rainfall estimation information.

The identification section uses the respective acquisition results of the detection result acquisition section and the weather information acquisition section to identify flooding of the road. Thus, flooding may be detected easily without using a flood detection sensor. Moreover, flooding of a road may be identified more accurately than in a case of directly detecting flooding of the road.

The first aspect may further include a collection section that collects post information from a social networking service, wherein the identification section identifies flooding of the road by using the acquisition results of the detection result acquisition section and the weather information acquisition section, and a collection result of the collection section. Thus, the accuracy of identification of flooding of the road may be further improved.

The first aspect may further include a detection section that detects flooding of the road on which the vehicle is running, on the basis of the running state data, wherein the detection result acquisition section acquiring the detection result from the detection section.

In the first aspect, the vehicle may be equipped with a detection section that detects flooding of the road on which the vehicle is running on the basis of the running state data, and the detection result acquisition section may acquire the detection result from the vehicle.

In the first aspect, the weather information may further include a recording section that records a flood point at which flooding of the road is identified by the identification section together with the weather information used at the time when the flooding is identified by the identification section; and a flood prediction section that predicts flooding of the flood point recorded at the recording section, by using an estimated rainfall amount represented by rainfall estimation information, the rainfall estimation information being acquired by the weather information acquisition section as the weather information, and the weather information of the flood point recorded at the recording section.

A second aspect of the present disclosure is a flood detection system including: a running detection section that detects plural kinds of running state data relating to running of a vehicle; an acquisition section that acquires the plural kinds of running state data detected by the running detection section from plural the vehicle; a derivation section that derives a pre-specified vehicle movement model that finds a physical quantity that changes in accordance with running of the vehicle, by using the plural kinds of running state data acquired from the plural vehicles by the acquisition section at a previous time, and a pre-specified learning model; a detection section that detects flooding of a road on which the vehicle of interest is running by using the vehicle movement model derived by the derivation section and the plural kinds of running state data acquired from a pre-specified vehicle of interest by the acquisition section at a current time to predict the physical quantity, and using the predicted physical quantity and a physical quantity obtained from the running state data acquired from the vehicle of interest by the acquisition section at the current time; a weather information acquisition section that acquires weather information including at least one of rainfall information representing a measured rainfall amount in a region in which the vehicle is running, or rainfall estimation information representing an estimated rainfall amount; and an identification section that identifies flooding of the road by using a detection result from the detection section and an acquisition result from the weather information acquisition section.

According to the second aspect, the detection section detects plural kinds of running state data relating to running of the vehicle.

The acquisition section acquires the plural kinds of running state data detected by detection sections from the plural vehicles.

The derivation section uses the plural kinds of running state data previously acquired from the plural vehicles by the acquisition section and the pre-specified learning model to derive the vehicle movement model for finding the physical quantity that changes in accordance with running of the vehicle.

The detection section uses the vehicle movement model derived by the derivation section and the plural kinds of current running state data acquired by the acquisition section from the pre-specified vehicle of interest to predict the physical quantity. The detection section uses the predicted physical quality and the physical quantity that is obtained from the current running state data acquired from the vehicle of interest by the acquisition section to detect flooding of a road on which the vehicle of interest is running.

The weather information acquisition section acquires the weather information that includes at least one of the rainfall information representing measured rainfall amounts in the region in which the vehicle is running or the rainfall estimation information representing an estimated rainfall amount.

The identification section uses each of the detection result from the detection section and the acquisition result from the weather information acquisition section to identify flooding of the road. Thus, flooding may be detected easily without using a flood detection sensor. Moreover, because flooding is identified using not only running state data but also weather information, flooding of a road may be identified accurately.

A third aspect of the present disclosure is a non-transitory computer readable storage medium storing a program that causes a computer to execute flood detection processing, the flood detection processing including: acquiring a detection result detecting flooding of a road on which a present vehicle is running, on the basis of plural kinds of running state data relating to the running of the present vehicle; acquiring weather information including at least one of rainfall information representing a measured rainfall amount in a region in which the present vehicle is running, or rainfall estimation information representing an estimated rainfall amount; and identifying flooding of the road by using the detection result and the weather information.

A fourth aspect of the present disclosure is a flood detection method including: acquiring a detection result detecting flooding of a road on which a present vehicle is running on the basis of plural kinds of running state data relating to the running of the present vehicle; acquiring weather information including at least one of rainfall information representing a measured rainfall amount in a region in which the present vehicle is running, or rainfall estimation information representing an estimated rainfall amount; and identifying flooding of the road by using the detection result and the weather information.

According to the present disclosure as described above, a flood detection device, a flood detection system, a flood detection program storage medium, and a flood detection method that may assess flooding of a road simply and accurately may be provided.

BRIEF DESCRIPTION OF THE DRAWINGS

FIG. 3 is a diagram illustrating an example of a table that associates vehicle types with coefficients of a model.

DETAILED DESCRIPTION

Figure 1:
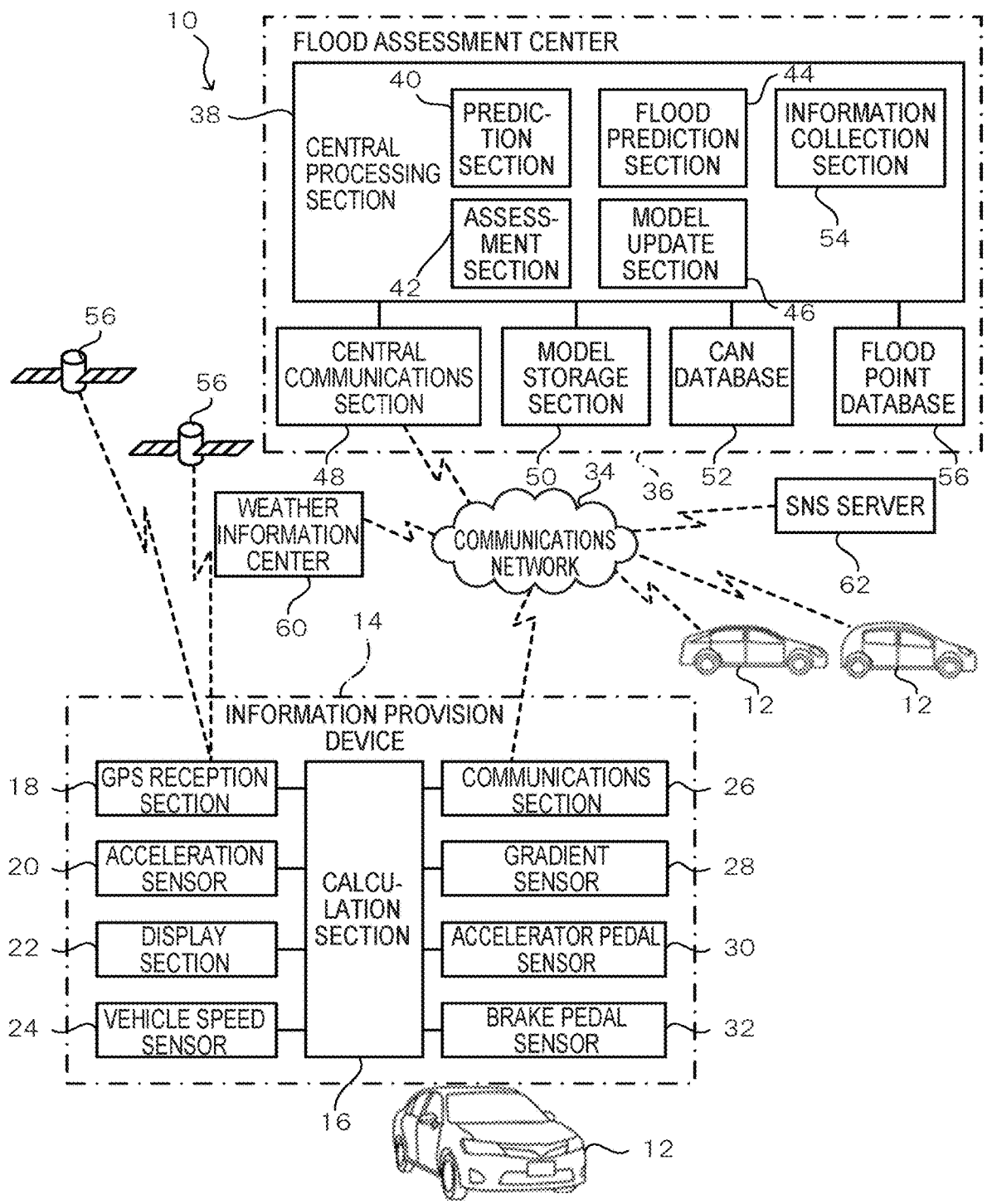
FIG. 1 is a block diagram illustrating a schematic configuration of a flood detection system according to an exemplary embodiment.

Herebelow, an exemplary embodiment of the present disclosure is described in detail with reference to the attached drawings. FIG. 1 is a block diagram illustrating a schematic configuration of a flood detection system according to the exemplary embodiment.

In a flood detection system 10 according to the exemplary embodiment, an information provision device 14 is respectively installed in plural vehicles 12. The information provision devices 14, a flood assessment center 36, a weather information center 60 and a social networking service (SNS) server 62 are respectively connected via a communications network 34.

The weather information center 60 provides various kinds of weather data relating to weather to devices connected to the communications network 34 in the form of weather information. The weather information includes, for example, weather data of at least one of measured rainfall amounts or estimated rainfall amounts at respective locations. In the descriptions below, the weather data that is described is mainly measured rainfall amounts. However, estimated rainfall amounts may be used in areas where measured rainfall amounts cannot be identified.

The SNS server 62 provides a service that enables communications between users who are registered in advance. For example, communications between users are enabled by the users collectively posting various kinds of information to the SNS server 62 in the form of post information.

The flood assessment center 36 collects running state data of the plural vehicles 12 from the information provision devices 14 installed in the vehicles 12, in the form of Controller Area Network (CAN) data, and acquires weather data from the weather information center 60. The flood assessment center 36 executes processing to assess flooding of roads on which the vehicles 12 are running, using the collected CAN data, weather data, SNS post information and the like. The flood assessment center 36 also uses a history of flood points assessed to have flooded and the weather data to predict flooding.

The information provision device 14 installed in each vehicle 12 is provided with a calculation section 16, a GPS reception section 18, an acceleration sensor 20, a display section 22, a vehicle speed sensor 24, a communications section 26, a gradient sensor 28, an accelerator pedal sensor 30 and a brake pedal sensor 32. The acceleration sensor 20, vehicle speed sensor 24, gradient sensor 28, accelerator pedal sensor 30 and brake pedal sensor 32 correspond to a running detection section.

The calculation section 16 is constituted by a general microcomputer including a central processing unit (CPU), read-only memory (ROM), random access memory (RAM) and so forth.

The GPS reception section 18 receives signals from Global Positioning System (GPS) satellites and outputs the received GPS signals to the calculation section 16. Hence, the calculation section 16 determines the position of the vehicle 12 on the basis of the GPS signals received from plural GPS satellites.

The acceleration sensor 20 senses accelerations applied to the present (local) vehicle 12 as running state data and outputs sensing results to the calculation section 16. Accelerations may be sensed in each of a front-and-rear direction, a width direction and a vertical direction of the vehicle 12, or only accelerations of the vehicle 12 in the front-and-rear direction may be sensed.

The display section 22 displays information (for example, map information or the like) about flood points that are assessed to be flooded by the flood assessment center 36, and various other kinds of information.

The vehicle speed sensor 24 senses running speeds of the present vehicle 12 as running state data and outputs sensing results to the calculation section 16.

The communications section 26 conducts wireless communications with the communications network 34, and thus communicates with the flood assessment center 36 and the information provision devices 14 installed in others of the vehicles 12. The communications network 34 includes, for example, a wireless communications circuit network such as a portable telephony circuit network or the like.

By sensing tilting of the vehicle 12, the gradient sensor 28 senses gradients along which the vehicle 12 is running as running state data and outputs sensing results to the calculation section 16. The gradients that are sensed may only be gradients in the front-and-rear direction of the vehicle 12, or gradients in the vehicle width direction may also be sensed.

The accelerator pedal sensor 30 senses pressing amounts of an accelerator pedal as running state data and outputs sensing results to the calculation section 16.

The brake pedal sensor 32 senses pressing amounts of a brake pedal as running state data and outputs sensing results to the calculation section 16.

In the exemplary embodiment, an example is described in which sensing results from the acceleration sensor 20, the vehicle speed sensor 24, the gradient sensor 28, the accelerator pedal sensor 30 and the brake pedal sensor 32 are detected as an example of the running state data, but this is not limiting.

The calculation section 16 transmits the plural kinds of running state data acquired from the sensors and a vehicle type ID, which identifies vehicle types, to the flood assessment center 36 via the communications section 26 and the communications network 34.

The flood assessment center 36 is provided with a central processing section 38, a central communications section 48, a model storage section 50, a CAN database 52 and a flood point database 56.

The central communications section 48 communicates with the information provision devices 14 installed at the vehicles 12, by conducting wireless communications with the communications network 34.

The model storage section 50 stores a vehicle movement model that finds a physical quantity (described in detail below) that changes in accordance with running of the vehicle 12, and a table of coefficients that are specified for each of the vehicle types.

The CAN database 52 stores, as CAN data, the running state data acquired from the information provision devices 14 installed at the vehicles 12.

The central processing section 38 is constituted by a general microcomputer including a central processing unit (CPU), read-only memory (ROM), random access memory (RAM) and so forth. The central processing section 38 features the functions of a prediction section 40, an assessment section 42, a model update section 46, an information collection section 54, and a flood prediction section 44. These functions are realized by the CPU of the central processing section 38 executing a program stored in the ROM or the like. The functions of the central processing section 38 correspond to a detection result acquisition section, a weather information acquisition section, an identification section, a collection section, a detection section, a recording section, a flood prediction section, an acquisition section and a derivation section. The functions of the central processing section 38 correspond to processing that is described in detail below.

The information collection section 54 collects information such as flood information contained in SNS post information exchanged between users via various SNS servers 62, weather data provided by the weather information center 60 and so forth.

The prediction section 40 reads out a vehicle movement model stored in advance in the model storage section 50, identifies a vehicle type from each vehicle type ID, and derives a vehicle movement model for the respective vehicle type by selecting coefficients corresponding to the vehicle type and applying the coefficients to the vehicle movement model. Predicted values of a physical quantity are calculated by substituting CAN data into the derived vehicle movement model. In the exemplary embodiment, vehicle speed is employed as the physical quantity to be predicted. Coefficients corresponding to the vehicle type that have been found beforehand are applied to a vehicle movement model for finding vehicle speed that has been derived beforehand, and predicted values of vehicle speed are calculated. A vehicle movement model for finding vehicle speed is described in detail below.

Figure 2:
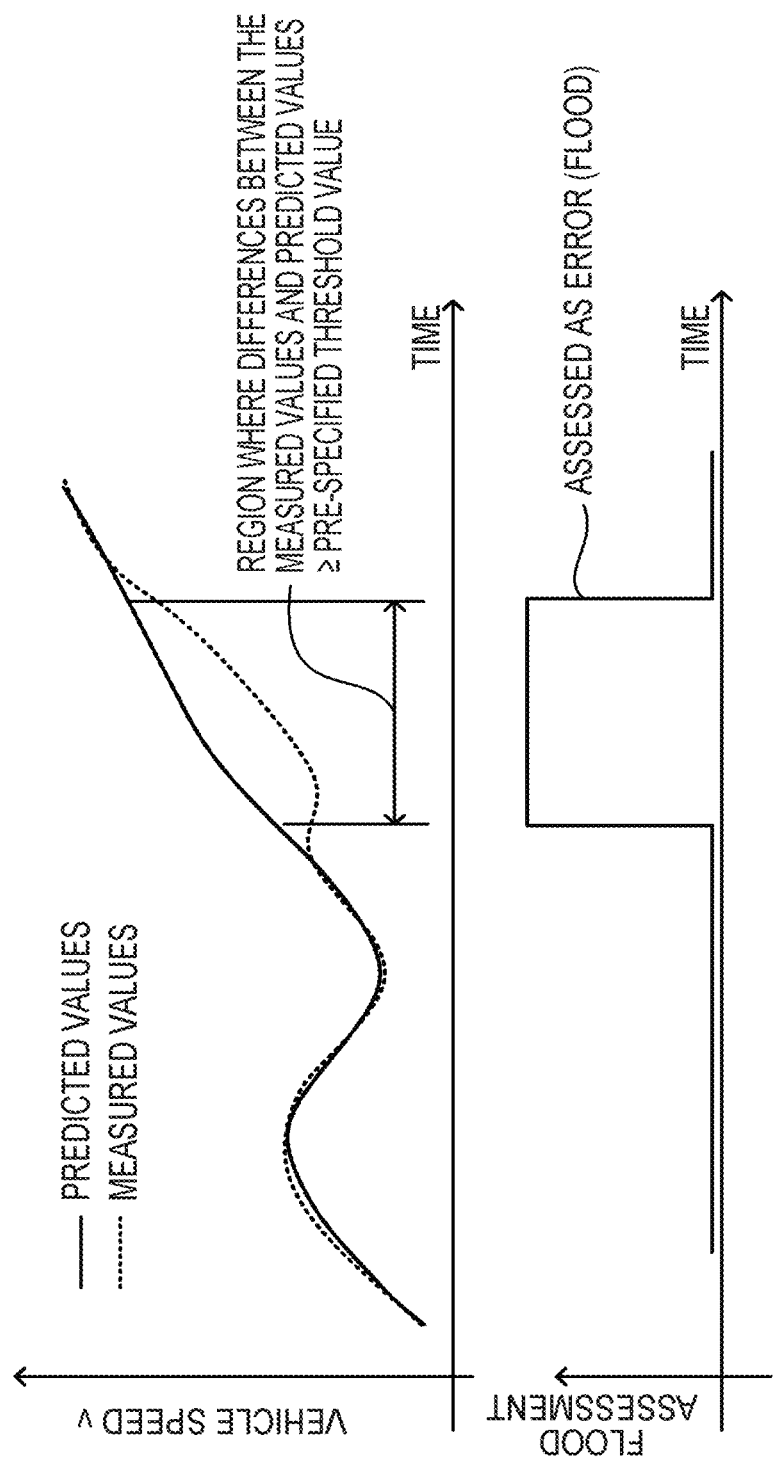
FIG. 2 is a diagram for describing an example of error (flood) assessment using predicted values and measured values of vehicle speed.

The assessment section 42 compares vehicle speeds predicted by the prediction section 40 with actual vehicle speeds acquired from the information provision device 14 and assesses whether or not a road is flooded. More specifically, the assessment section 42 detects flooding of a road by assessing that the road is flooded in a case in which a difference between a predicted speed and a measured speed is at least a pre-specified threshold value. For example, as illustrated in FIG. 2, in a case in which the measured values and predicted values are changing with the passing of time, the assessment section 42 determines that there is an error (a flood) in an area where a state in which the differences between the measured values and the predicted values are at least the pre-specified threshold value continues for a pre-determined duration (for example, 5 seconds or more). The assessment section 42 also executes processing to use SNS post information, weather data and the like collected by the information collection section 54 to improve the accuracy of this flood assessment based on CAN data.

The model update section 46 uses CAN data stored in the CAN database 52 to derive the coefficients of the vehicle movement model by machine learning, stores the coefficients in the model storage section 50, and continuously updates a model coefficients table.

Now, an example of the above-mentioned vehicle movement model that finds vehicle speed is described in detail. In the exemplary embodiment, a vehicle movement model that uses equations of motion to find the physical quantity that is vehicle speed is derived.

First, an equation of motion is represented by the following expression (1).

$$M \times (dv/dt) = F \quad (1)$$

Here, M represents vehicle weight, dv/dt represents acceleration, and F represents a forward progress force of the vehicle 12.

The following expression (2) represents dv/dt approximately.

$$dv/dt = (v(t+\Delta t) - v(t))/\Delta t \quad (2)$$

Here, $v(t+\Delta t)$ is a vehicle speed $\Delta t$ seconds later (a predicted vehicle speed), t is time, and v(t) is the vehicle speed at a current time.

Substituting expression (2) into expression (1) provides the following expression (3).

$$M \times (v(t+\Delta t) - v(t))/\Delta t = F \quad (3)$$

Rearranging for $v(t+\Delta t)$ provides the following expression (4).

$$v(t+\Delta t) = v(t) + (F/M) \times \Delta t \quad (4)$$

The term F is made up of F=F1 (driving force of the vehicle 12)–F2 (resistance acting on the vehicle 12). Using CAN data provides the following expression (5).

$$F1 = C1 \times R \quad (5)$$

Here, C1 is a coefficient and R is an accelerator pressing amount, which is obtained from the CAN data.

$$F2 = \text{air resistance+slope resistance+rolling resistance+acceleration resistance} \quad (6)$$

Air resistance=$C21 \times v(t)^2$
Slope resistance=$C22 \times \sin \theta$
Rolling resistance=$C23 \times v(t)$
Acceleration resistance=$C24 \times a(t)$ Here, C21, C22, C23 and C24 are coefficients, θ is a road gradient, v(t) is the vehicle speed, and a(t) is acceleration; these are obtained from the CAN data.

Substituting expressions (5) and (6) into expression (4) may provide the following multiple regression equation to serve as a vehicle movement model.

$$v(t+\Delta t) = v(t) + \{C1 \times R - (C21 \times v(t)^2 + C22 \times \sin \theta + C23 \times v(t) + C24 \times a(t))\} \times (\Delta t/M) \quad (7)$$

The coefficients are found by a multiple regression analysis learning model using large volumes of CAN data collected from the plural vehicles 12 and stored in the CAN database, and the coefficients are stored in the model storage section 50 as a coefficient table. Upon new CAN data is acquired, the coefficients stored in the model storage section 50 are updated. Because the coefficients differ between different vehicle types, the coefficients are found and updated for each vehicle type. For example, as illustrated in FIG. 3, the coefficients stored in the model storage section 50 are stored in the form of a table associating the vehicle types with the model coefficients.

Figure 4:
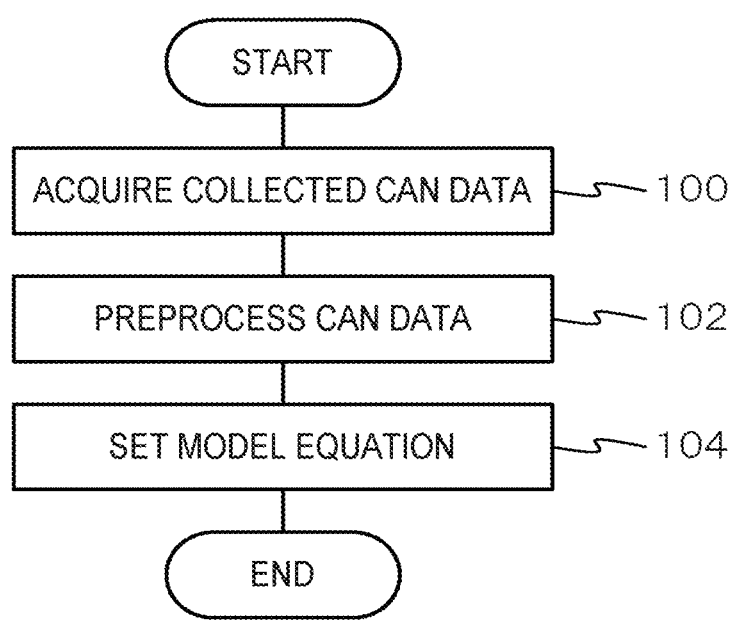
FIG. 4 is a flowchart illustrating an example of a flow of processing that is executed by a central processing section, at a flood assessment center of the flood detection system according to the exemplary embodiment, when deriving a vehicle movement model by machine learning.

Now, processing of the central processing section 38 of the flood assessment center 36 that derives the vehicle movement model in the flood detection system 10 according to the exemplary embodiment configured as described above is described. FIG. 4 is a flowchart illustrating an example of a flow of processing that is executed by the central processing section 38 of the flood assessment center 36 of the flood detection system 10 according to the exemplary embodiment to derive a vehicle movement model by machine learning. The processing in FIG. 4 is executed when initially deriving coefficients of the vehicle movement model and each time CAN data is collected into the CAN database 52.

In step 100, the model update section 46 acquires CAN data serving as running state data that has been collected into the CAN database 52 via the central communications section 48, and proceeds to step 102. Note that step 100 corresponds to the processing of the acquisition section.

In step 102, the model update section 46 performs pre-processing of the acquired CAN data, and the central processing section 38 proceeds to step 104. The preprocessing is, for example, sorting the CAN data by date/time and vehicle type, and categorizing the CAN data into time sets and vehicle type sets. The preprocessing may include processing each set of CAN data to standardize times, interpolate missing data and the like.

In step 104, the model update section 46 sets a model equation, stores the model equation in the model storage section 50, and the central processing section 38 ends this sequence of processing. That is, the model update section 46 uses the CAN data to derive the coefficients of the aforementioned multiple regression equation serving as the vehicle movement model by machine learning, and stores the coefficients in the model storage section 50. If coefficients have been stored previously, the coefficients are updated. Note that step 104 corresponds to the processing of the derivation section.

Figure 5:
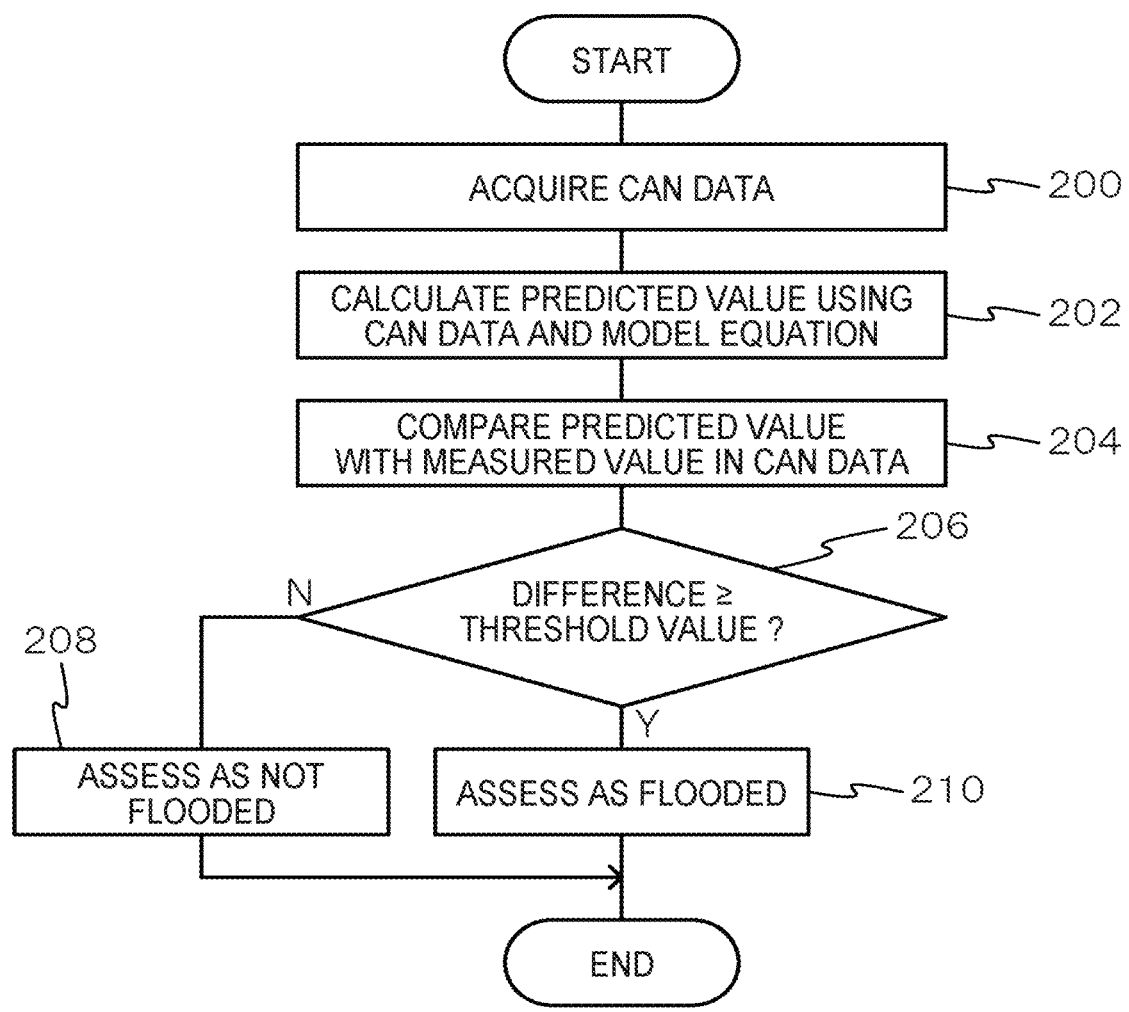
FIG. 5 is a flowchart illustrating an example of a flow of processing that is executed by the central processing section when assessing flooding, at the flood assessment center of the flood detection system according to the exemplary embodiment.

Now, processing that is executed by the central processing section 38 of the flood assessment center 36 to assess flooding on the basis of CAN data from the vehicles 12 is described. FIG. 5 is a flowchart illustrating an example of a flow of processing that is executed by the central processing section 38 of the flood assessment center 36 of the flood detection system 10 according to the exemplary embodiment to assess flooding. The processing in FIG. 5 is executed during processing to improve the accuracy of flood assessment, which is described below.

In step 200, the central processing section 38 acquires CAN data from one of the information provision devices 14 via the central communications section 48 and the communications network 34, and the central processing section 38 proceeds to step 202. Note that step 200 corresponds to the processing of the acquisition section, and the subsequent processing of steps 202 to 210 corresponds to the processing of the detection section.

In step 202, the prediction section 40 uses the acquired CAN data and the vehicle movement model to calculate a predicted value of vehicle speed, and the central processing section 38 proceeds to step 204. That is, the prediction section 40 reads out the vehicle movement model stored in the model storage section 50, identifies the vehicle type from the vehicle type ID, selects the coefficients corresponding to that vehicle type, and deploys the coefficients in the vehicle movement model. Thus, the predicted value of vehicle speed is calculated by substituting the acquired CAN data into the vehicle movement model.

In step 204, the assessment section 42 compares the predicted value of vehicle speed with a measured value of vehicle speed in actual CAN data acquired from the information provision device 14, and the central processing section 38 proceeds to step 206.

In step 206, the assessment section 42 makes a determination as to whether a difference between the predicted value and the measured value is at least the pre-specified threshold value. In a case in which the result of this determination is negative, the central processing section 38 proceeds to step 208, and in a case in which the result is affirmative, the central processing section 38 proceeds to step 210.

In step 208, the assessment section 42 assesses that a road on which the vehicle 12 that acquired the CAN data is running is free of flooding and not flooded, and the central processing section 38 ends this sequence of processing.

Alternatively, in step 210 the assessment section 42 assesses that the road on which the vehicle 12 that acquired the CAN data is running is flooded, and the central processing section 38 ends the sequence of processing.

Figure 6:
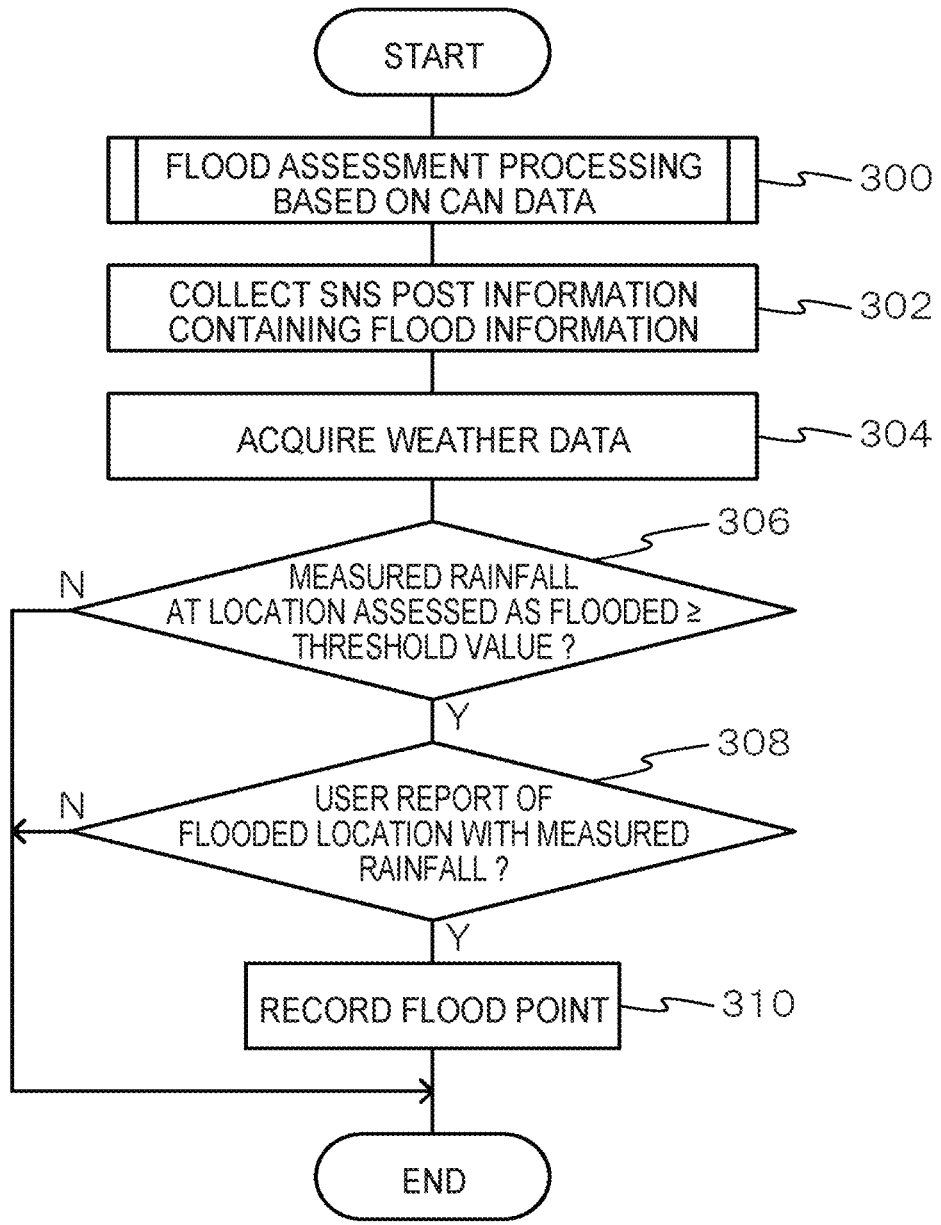
FIG. 6 is a flowchart illustrating an example of a flow of processing, in the flood detection system according to the exemplary embodiment, that uses SNS post information and weather data collected by an information collection section to improve the accuracy of the flood assessment performed by the central processing section.
Figure 7:
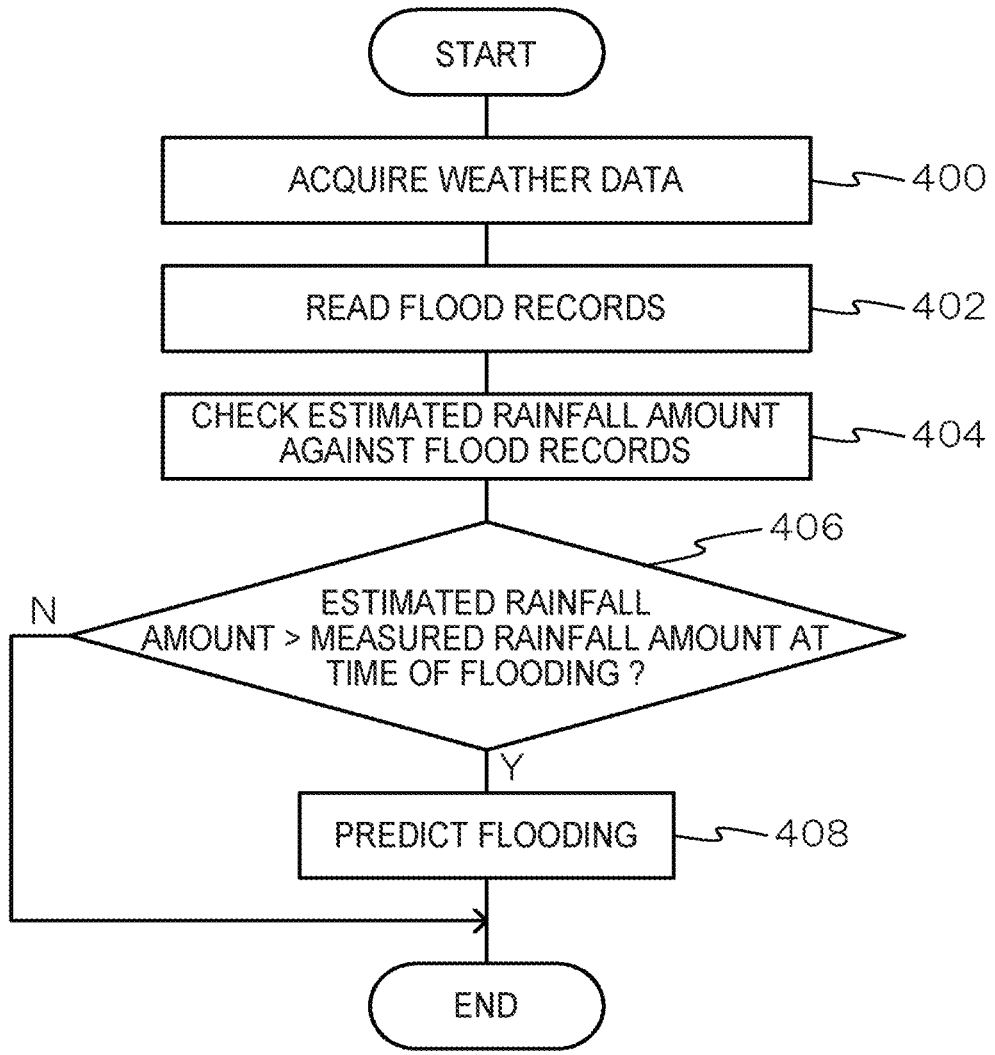
FIG. 7 is a flowchart illustrating an example of a flow of flood prediction processing that is executed by a flood prediction section of the flood detection system according to the exemplary embodiment.

Next, processing in the flood detection system 10 according to the exemplary embodiment to utilize SNS post information, weather data and the like collected by the information collection section 54 and improve the accuracy of flood assessment by the central processing section 38 is described. FIG. 6 is a flowchart illustrating an example of a flow of processing that uses the SNS post information, and weather data collected by the information collection section 54 to improve the accuracy of the flood assessment performed by the central processing section 38. The processing in FIG. 7 is started, for example, each time CAN data is acquired from the information provision device 14 of one of the vehicles 12 or each time a pre-specified amount of CAN data has been acquired.

In step 300, the central processing section 38 executes the flood assessment processing based on CAN data, and proceeds to step 302. That is, a flood assessment result is acquired by carrying out the flood assessment processing illustrated in FIG. 5 described above. Note that step 300 corresponds to the processing of the detection result acquisition section.

In step 302, by accessing the SNS server 62 via the central communications section 48 and the communications network 34, the information collection section 54 collects SNS post information containing flood information, and the central processing section 38 proceeds to step 304. Note that step 302 corresponds to the processing of the collection section.

In step 304, by accessing the weather information center 60 via the central communications section 48 and the communications network 34, the information collection section 54 acquires weather data, and the central processing section 38 proceeds to step 306. Note that step 304 corresponds to the processing of the weather information acquisition section.

In step 306, for a location that is assessed to be flooded by the flood assessment processing based on CAN data in step 300, the assessment section 42 makes a determination based on the weather data as to whether a measured rainfall at the location is at least a pre-specified threshold value. In a case in which the result of the determination is affirmative, the central processing section 38 proceeds to step 308, and in a case in which the result is negative, the central processing section 38 ends this sequence of processing. The determination in step 306 may instead be a determination as to whether an assessment of flooding by the flood assessment processing based on CAN data in step 300 is within an area in which a measured rainfall is at least the pre-specified threshold value.

In step 308, the assessment section 42 makes a determination as to whether there is a user report of the location assessed to be flooded at which the measured rainfall is at least the pre-specified threshold value of step 306. This determination is a determination as to whether SNS post information indicating a flood report has been acquired for the location assessed to be flooded by the flood assessment processing based on CAN data in step 300. In a case in which the result of the determination is affirmative, the central processing section 38 proceeds to step 310, and in a case in which the result is negative, the central processing section 38 ends this sequence of processing.

In step 310, the assessment section 42 records a flood point in the flood point database 56, and the central processing section 38 ends the sequence of processing. When a flood point is being recorded, the assessment section 42 also records weather data such as the measured rainfall amount, an estimated rainfall amount or the like. The flood points recorded in the flood point database 56 may, for example, be distributed as flood information to each information provision device 14 connected to the communications network 34 via the central communications section 48. Hence, at the vehicle 12 in which each information provision device 14 is installed, flood points may be known and a route that does not pass through a flood point may be selected. For example, in a case in which route guidance that passes through a flood point is being provided by a navigation device, the navigation device may re-route to a route that avoids the flood point. Alternatively, information on flood points may be distributed to weather forecasting companies and the like as necessary and be evaluated. Note that steps 306 to 310 correspond to the processing of the identification section and step 310 corresponds to the processing of the recording section.

Next, flood prediction processing that is executed by the flood prediction section 44 of the flood detection system according to the exemplary embodiment is described. FIG. 7 is a flowchart illustrating an example of a flow of the flood prediction processing that is executed by the flood prediction section 44 of the flood detection system 10 according to the exemplary embodiment. The processing in FIG. 7 may be started, for example, after an occupant of the vehicle 12 makes a request for a flood prediction from the information provision device 14 to the flood assessment center 36. Alternatively, the processing in FIG. 7 may be started upon a warning of rainfall is issued from the weather information center 60, such as a heavy rain warning, a flood warning, landslide warning information or the like.

In step 400, the flood prediction section 44 acquires weather data, such as estimated rainfall amounts, estimated raincloud amounts and the like, from the weather information center 60 via the central communications section 48 and the communications network 34, and the central processing section 38 proceeds to step 402.

In step 402, the flood prediction section 44 reads out flood records recorded in the flood point database 56, and the central processing section 38 proceeds to step 404.

In step 404, the flood prediction section 44 checks an estimated rainfall amount against the flood records, and the central processing section 38 proceeds to step 406. That is, the flood prediction section 44 checks the estimated rainfall amounts acquired as weather data against measured rainfall amounts at locations that have been recorded as flood points.

In step 406, the flood prediction section 44 makes a determination, from the results of checking in step 404, as to whether an estimated rainfall amount at a flood point exceeds a measured rainfall amount at a time of flooding. In a case in which the result of this determination is negative, the central processing section 38 simply ends this processing, and in a case in which the result is affirmative, the central processing section 38 proceeds to step 408.

In step 408, the flood prediction section 44 predicts flooding and ends this sequence of processing. In a case in which flooding is predicted, flood prediction information may be distributed to each information provision device 14 connected to the communications network 34 via the central communications section 48.

In the processing in FIG. 6 to improve the accuracy of flood assessment of the exemplary embodiment described above, the flood assessment is carried out using an assessment result of the flood assessment processing based on CAN data, weather data, and SNS post information, but this is not limiting. For example, a mode is possible in which steps 302 and 308 in FIG. 6 are omitted and the flood assessment is carried out without using SNS post information. Alternatively, a mode is possible in which steps 304 and 306 are omitted, step 308 makes the determination as to whether there is a user report of the location assessed to be flooded by the flood assessment processing based on CAN data, and thus flooding is assessed without using weather data.

Figure 8:
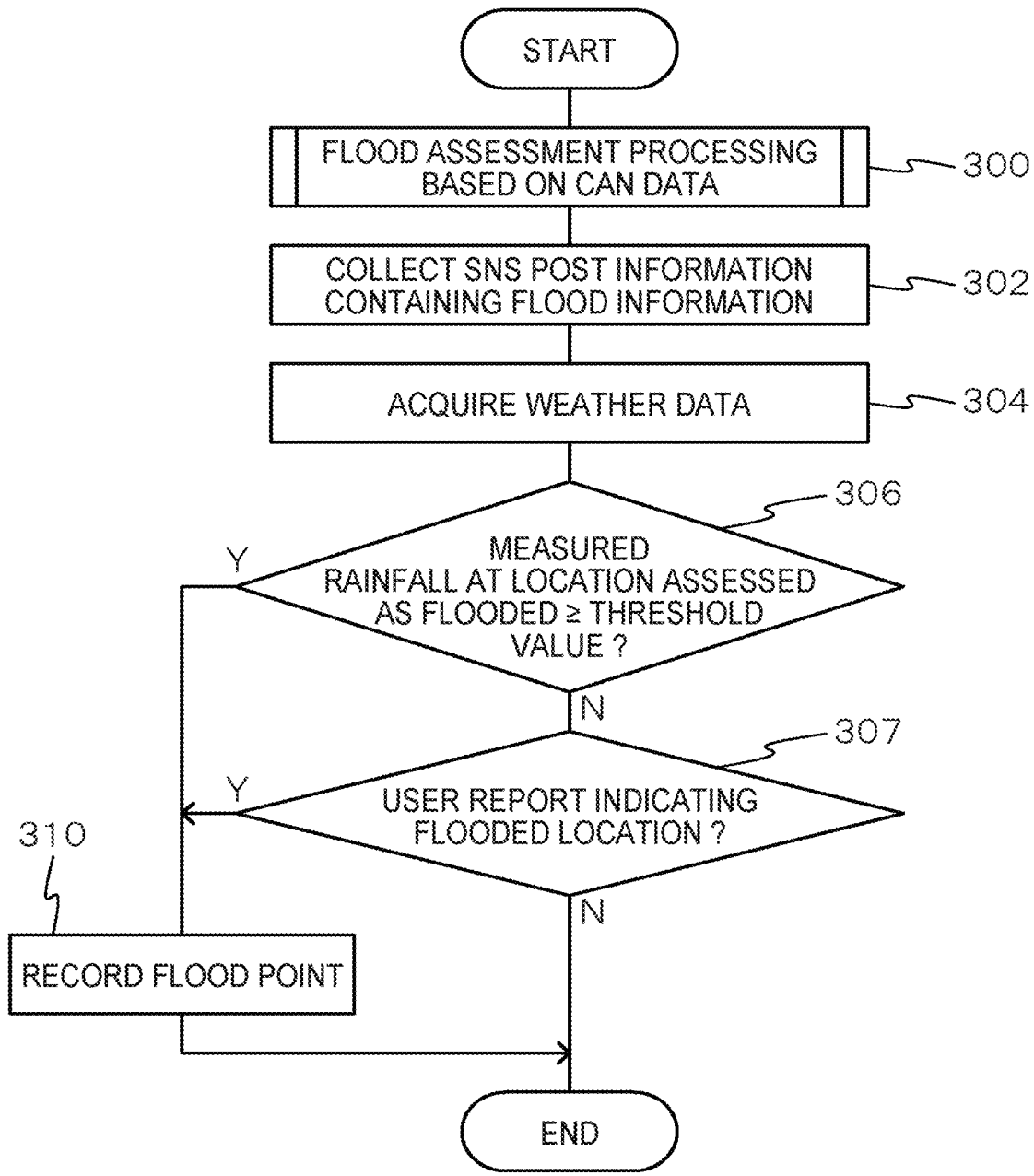
FIG. 8 is a flowchart illustrating an example of a flow of processing to record a location assessed to be flooded by flood assessment processing based on CAN data as a flood point in a flood point database both in a case in which there is measured rainfall at the location and in a case in which there is SNS post information indicating a flood report.

In the processing in FIG. 6 to improve the accuracy of flood assessment of the exemplary embodiment described above, a location assessed to be flooded by the flood assessment processing based on CAN data is recorded in the flood point database 56 as a flood point in a case in which there is measured rainfall at the location and there is a user report, but this is not limiting. For example, a mode is possible in which a flood point is recorded in the flood point database 56 both in a case in which there is measured rainfall at a location assessed to be flooded by the flood assessment processing based on CAN data, and in a case in which there is SNS post information indicating a report of a flood location. In this configuration, the processing illustrated in FIG. 8 is executed. FIG. 8 is a flowchart illustrating an example of a flow of processing in which a flood point is recorded in the flood point database 56 both in a case in which there is measured rainfall at a location assessed to be flooded by the flood assessment processing based on CAN data, and in a case in which there is SNS post information indicating a flood report. Processing that is similar to FIG. 6 is assigned the same reference symbols and is not described in detail here.

The processing of steps 300 to 304 described above is executed in the same manner as in FIG. 6, and then the central processing section 38 proceeds to step 306.

In step 306, similar to FIG. 6, for a location that is assessed to be flooded by the flood assessment processing based on CAN data in step 300, the assessment section 42 makes a determination based on the weather data as to whether a measured rainfall at the location is at least the pre-specified threshold value. In a case in which the result of this determination is negative, the central processing section 38 proceeds to step 307, and in a case in which the result is affirmative, the central processing section 38 proceeds to step 310.

In step 307, the assessment section 42 makes a determination as to whether there is a user report indicating a location of flooding. This determination is a determination as to whether SNS post information indicating a flood report has been acquired. In a case in which the result of the determination is affirmative, the central processing section 38 proceeds to step 310, and in a case in which the result is negative, the central processing section 38 ends this sequence of processing.

Figure 9:
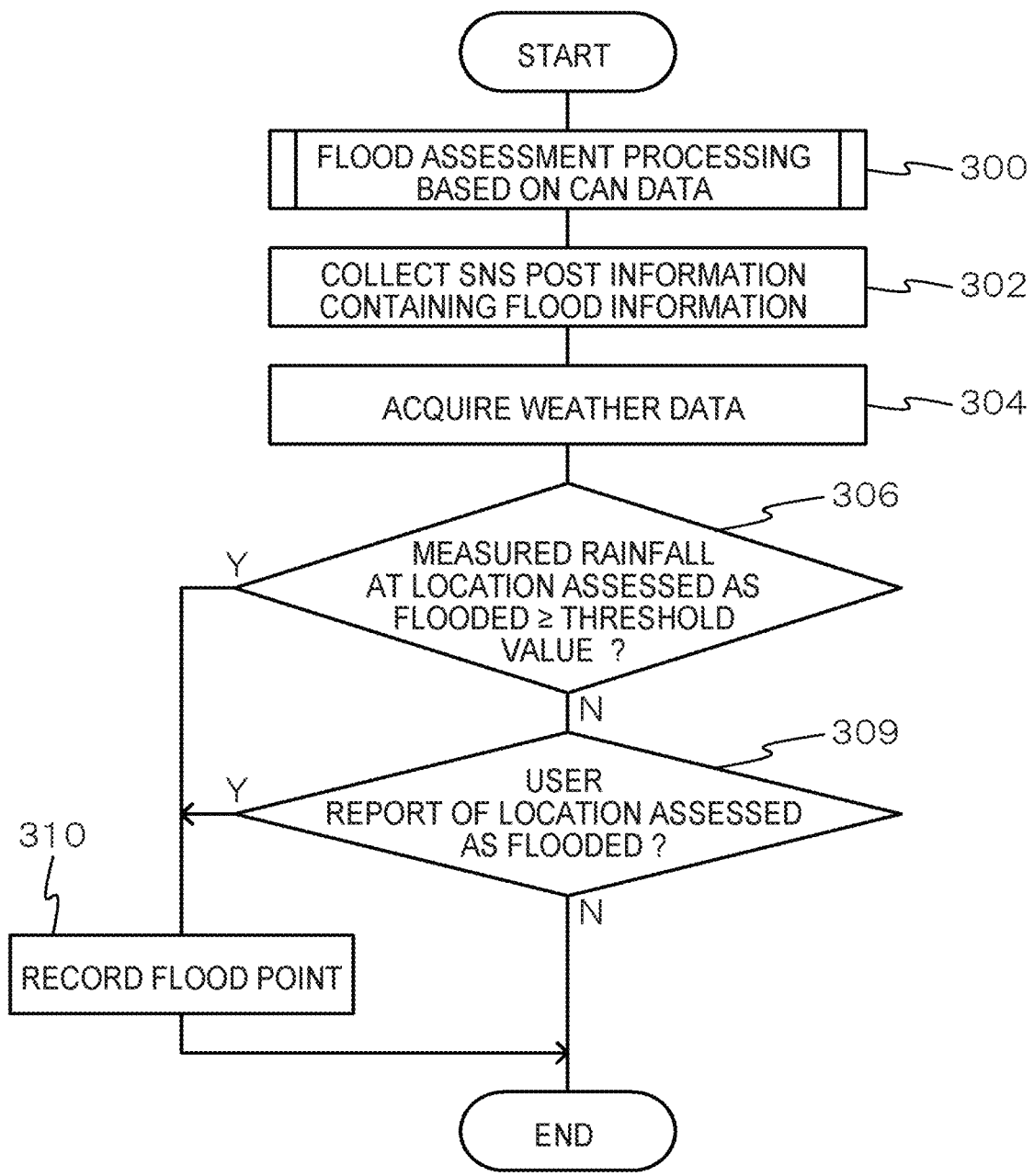
FIG. 9 is a flowchart illustrating an example of a flow of processing to record a location assessed to be flooded by the flood assessment processing based on CAN data as a flood point in the flood point database both in a case in which there is measured rainfall at the location and in a case in which there is SNS post information indicating a flood report at the location assessed to be flooded by the flood assessment processing based on CAN data.

Alternatively, a mode is possible in which a flood point is recorded in the flood point database 56 in a case in which there is measured rainfall at a location assessed to be flooded by the flood assessment processing based on CAN data, and in a case in which there is SNS post information indicating a flood report of the location assessed to be flooded by the flood assessment processing based on CAN data. In this configuration, the processing illustrated in FIG. 9 is executed. FIG. 9 is a flowchart illustrating an example of a flow of processing in which a flood point is recorded in the flood point database 56 in a case in which there is measured rainfall at a location assessed to be flooded by the flood assessment processing based on CAN data, and in a case in which there is SNS post information indicating a flood report at the location assessed to be flooded by the flood assessment processing based on CAN data. Processing that is similar to FIG. 8 is assigned the same reference symbols and is not described in detail here.

That is, step 309 is executed instead of step 307 of FIG. 8. In step 309, the assessment section 42 makes a determination as to whether there is a user report of the location assessed to be flooded by the flood assessment processing based on CAN data in step 300. This determination is a determination as to whether SNS post information has been acquired that indicates a flood report at the location assessed to be flooded by the flood assessment processing based on CAN data in step 300. In a case in which the result of the determination is affirmative, the central processing section 38 proceeds to step 310, and in a case in which the result is negative, the central processing section 38 ends this sequence of processing.

Figure 10:
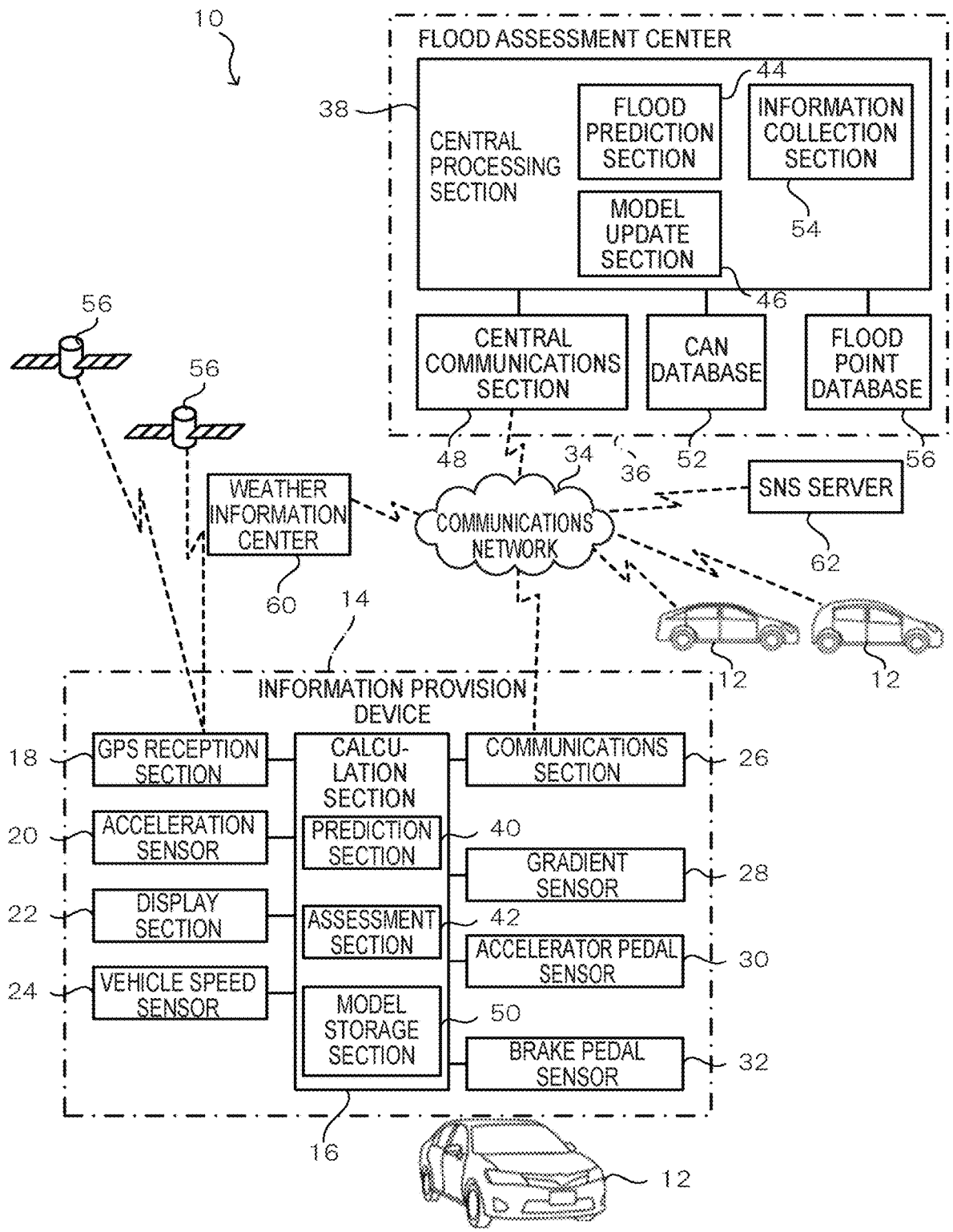
FIG. 10 is a block diagram illustrating a configuration example of the flood detection system in a case in which an information provision device is installed in each vehicle and flood assessment using CAN data is carried out at the information provision device side.

In the exemplary embodiment described above, an example is described in which the flooding is assessed using CAN data at the flood assessment center 36 side, but this is not limiting. For example, flood assessment using CAN data may be carried out at the information provision device 14 side installed in each vehicle 12. FIG. 10 is a block diagram illustrating a configuration example of a flood detection system in a case in which flood assessment using CAN data is carried out at the information provision device 14 side installed in the vehicle 12. In this configuration, as illustrated in FIG. 10, the functions of the prediction section 40, the assessment section 42 and the model storage section 50 are provided at the information provision device 14. That is, a vehicle movement model corresponding to the vehicle type of the vehicle 12 in which the information provision device 14 is installed is derived in advance and stored in the model storage section 50. Or, plural vehicle movement models for respective vehicle types are derived and stored in advance, and the vehicle movement model corresponding to the present vehicle is selected in a case in which the vehicle movement model is to be used. Due to the processing of FIG. 5 being executed by the calculation section 16 of the information provision device 14, the predicted values may be calculated by the prediction section 40 and flooding may be assessed by the assessment section 42 in the same manner as in the exemplary embodiment described above. In a case in which the flood assessment is carried out at the information provision device 14 side installed in the vehicle 12, the processing of FIG. 5 is switched as appropriate to processing that is executed by the calculation section 16. The processing of step 200 that is executed by the calculation section 16 in this case corresponds to the processing of the acquisition section, and the processing of steps 202 to 210 corresponds to the processing of the detection section.

Figure 11:
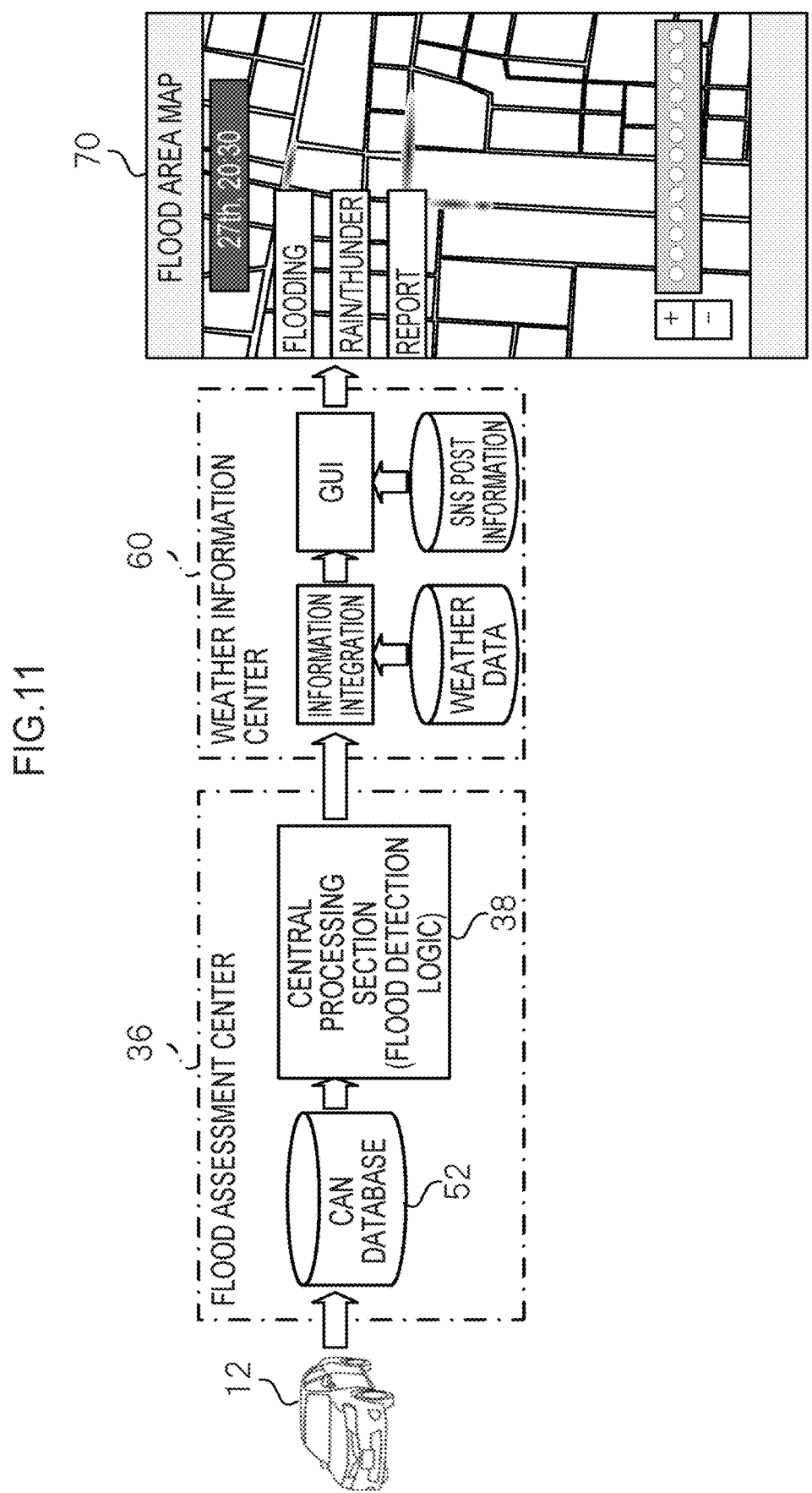
FIG. 11 is a diagram illustrating an example in which the weather information center 60 implements a service that collects the weather data, flood assessment information and SNS post information and provides a flood area map.

In the exemplary embodiment described above, an example is described in which weather data, SNS post information and running state data are collected at the flood assessment center 36, but this is not limiting. For example, a mode is possible in which the weather information center 60 collects weather data, collects flood assessment information representing a flood assessment result from the flood assessment center 36, and collects post information from the SNS server 62. FIG. 11 is a diagram illustrating an example in which the weather information center 60 implements a service that collects the weather data, flood assessment information and SNS post information and provides a flood area map. In the example in FIG. 11, the flood assessment center 36 assesses flooding by collecting CAN data from the vehicles 12 and aggregating the CAN data in the CAN database 52. Similarly to the exemplary embodiment described above, the central processing section 38 uses the CAN data to implement flood assessment logic that assesses flooding. The weather information center 60 also collects flood assessment information representing flood assessment results from the flood assessment logic, and collects the weather data and SNS post information. Hence, the weather information center 60 executes the processing of FIG. 6 using the flood assessment information, weather data and SMS post information, integrates the information and applies the information to a graphical user interface (GUI). Then, as illustrated in FIG. 11, the weather information center 60 provides a flood area map 70 illustrating flooded places on a map to a portable terminal device of a customer or the like. The flood area map 70 is updated, for example, at a pre-specified time interval such as every five minutes or the like, or upon an update command is given.

Figure 12:
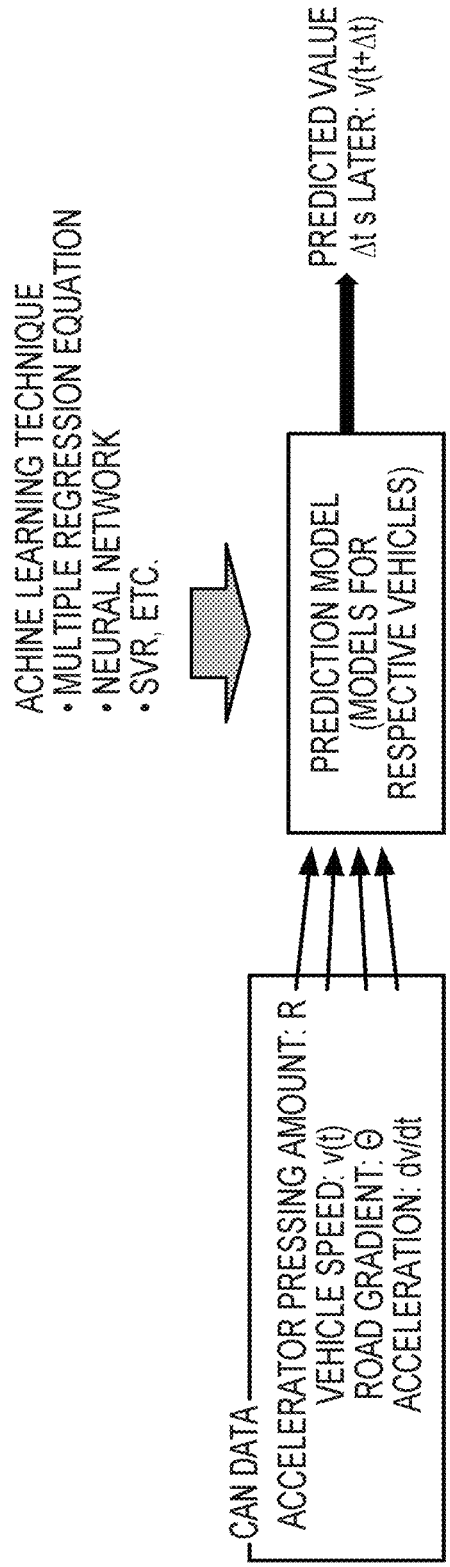
FIG. 12 is a diagram for describing alternative examples of a vehicle movement model.

In the exemplary embodiment described above, an example is described in which a multiple regression equation is used as the vehicle movement model. However, the vehicle movement model is not limited to machine learning based on a multiple regression equation. For example, as illustrated in FIG. 12, a vehicle movement model may employ various kinds of prediction model that use CAN data (accelerator pressing amount R, vehicle speed v(t), road gradient θ, acceleration dv/dt and the like) as the described variable terms in a prediction equation to find a predicted value v(t+Δt) after Δt seconds. Various kinds of machine learning model other than a multiple regression equation may be employed as a prediction model, such as a neural network, support vector regression (SVR) or the like.

In the exemplary embodiment described above, the vehicle movement model that finds the physical quantity that is vehicle speed is used, but the physical amount is not limited thus. A vehicle movement model that finds an alternative physical quantity such as, for example, acceleration, rate of change of acceleration, or the like may be used.

In the exemplary embodiment described above, a vehicle movement model is derived in which air resistance, slope resistance, rolling resistance and acceleration resistance serve as a resistance F2 acting on the vehicle. However, the resistance F2 acting on the vehicle is not limited thus. For example, because rolling resistance and acceleration resistance are smaller than other kinds of resistance, one or more kinds of resistance may be omitted.

The processing executed by the respective sections of the flood detection system 10 according to the exemplary embodiment described above is described as software processing that is implemented by a program being executed, but this is not limiting. For example, the processing may be implemented in hardware. Alternatively, the processing may be a combination of both software and hardware processing. Further, in a case in which the processing is implemented in software, the program may be stored in any of various storage media and distributed.

The present disclosure is not limited by the above recitations. In addition to the above recitations, it will be clear that numerous modifications may be embodied within a technical scope not departing from the gist of the disclosure.

What is claimed is:

1. A flood detection device comprising:
   a memory; and
   a processor coupled to the memory, the processor configured to:
   acquire a detection result detecting flooding of a road on which a vehicle is running, on the basis of a plurality of kinds of running state data relating to the running of the vehicle;
   acquire weather information including at least one of rainfall information representing a measured rainfall amount in a region in which the vehicle is running, or rainfall estimation information representing an estimated rainfall amount; and
   identify flooding of the road by using the detection result and the weather information,
   wherein the detection result is acquired by comparing a predicted vehicle speed at a time after a predetermined time period from a given time with a measured vehicle speed at the time after the predetermined time period from the given time, the predicted vehicle speed being calculated based on the running state data at the given time, and wherein the detection result indicates that the road is flooding in an area where a difference between the predicted vehicle speed and the measured vehicle speed continues to be at least a predetermined threshold for a predetermined duration.

2. The flood detection device according to claim 1, wherein the processor is further configured to:
collect post information from a social networking service; and
identify flooding of the road by using the detection result, the weather information, and a collection result of the post information.

3. The flood detection device according to claim 1, wherein the processor is further configured to detect flooding of the road on which the vehicle is running, on the basis of the running state data to acquire the detection result.

4. The flood detection device according to claim 1, wherein the vehicle is equipped with a detection section that detects flooding of the road on which the vehicle is running on the basis of the running state data, and
the processor is further configured to acquire the detection result from the vehicle.

5. The flood detection device according to claim 1, wherein the processor is further configured to:
record a flood point at which flooding of the road is identified together with the weather information used at the time when the flooding is identified; and
predict flooding of the recorded flood point by using
an estimated rainfall amount represented by rainfall estimation information acquired as the weather information, and
the recorded weather information of the flood point.

6. The flood detection device according to claim 1, wherein the plurality of kinds of running state data includes an accelerator pressing amount, a road gradient, a vehicle speed, and acceleration at the given time.

7. The flood detection device according to claim 1, wherein the detection result indicates that the road is flooding in a case in which a difference between the predicted vehicle speed and the measured vehicle speed is at least a predetermined threshold.

8. The flood detection device according to claim 1, wherein the detection result includes information of a location where the flooding is detected, and
the processor is further configured to identify the flooding of the road by determining, based on the weather information, whether a measured rainfall at the location is at least a predetermined threshold.

9. A flood detection system comprising:
a running detection section that detects a plurality of kinds of running state data relating to running of a vehicle; and
a server comprising a memory and a processor coupled to the memory, the processor configured to:
acquire the plurality of kinds of running state data detected by the running detection section from a plurality of the vehicle;
derive a pre-specified vehicle movement model that finds a physical quantity that changes in accordance with running of the vehicle, by using the plurality of kinds of running state data acquired from the plurality of vehicles at a previous time, and a pre-specified learning model;
detect flooding of a road on which the vehicle of interest is running by using the derived vehicle movement model and the plurality of kinds of running state data acquired from a pre-specified vehicle of interest at a given time to obtain a predicted vehicle speed at a time after a predetermined time period from the given time, and comparing the predicted vehicle speed with a measured vehicle speed obtained from the running state data acquired from the vehicle of interest at the time after the predetermined time period from the given time;
acquire weather information including at least one of rainfall information representing a measured rainfall amount in a region in which the vehicle is running, or rainfall estimation information representing an estimated rainfall amount; and
identify flooding of the road by using a detection result of flooding and the weather information,
wherein the detection result indicates that the road is flooding in an area where a difference between the predicted vehicle speed and the measured vehicle speed continues to be at least a predetermined threshold for a predetermined duration.

10. A non-transitory computer readable storage medium storing a program that causes a computer to execute flood detection processing, the flood detection processing comprising:
acquiring a detection result detecting flooding of a road on which a present vehicle is running, on the basis of a plurality of kinds of running state data relating to the running of the present vehicle;
acquiring weather information including at least one of rainfall information representing a measured rainfall amount in a region in which the present vehicle is running, or rainfall estimation information representing an estimated rainfall amount; and
identifying flooding of the road by using the detection result and the weather information,
wherein the detection result is acquired by comparing a predicted vehicle speed at a time after a predetermined time period from a given time with a measured vehicle speed at the time after the predetermined time period from the given time, the predicted vehicle speed being calculated based on the running state data at the given time, and
wherein the detection result indicates that the road is flooding in an area where a difference between the predicted vehicle speed and the measured vehicle speed continues to be at least a predetermined threshold for a predetermined duration.

11. The storage medium according to claim 10, wherein the acquiring of the detection result comprises:
detecting a plurality of kinds of running state data relating to running of a vehicle among a plurality of vehicles;
acquiring the detected plurality of kinds of running state data from the plurality of vehicles;
deriving a vehicle movement model that finds a physical quantity that changes in accordance with running of the vehicle, by using the plurality of kinds of running state data acquired from the plurality of vehicles at a previous time, and a pre-specified learning model; and
detecting flooding of a road on which the present vehicle is running, by using the derived vehicle movement model and the plurality of kinds of running state data acquired from the present vehicle at the given time to obtain the predicted vehicle speed at the time after the predetermined time period from the given time, and comparing the predicted vehicle speed with the measured vehicle speed obtained from the running state data acquired from the present vehicle at the time after the predetermined time period from the given time.

12. A flood detection method comprising:
acquiring a detection result detecting flooding of a road on which a present vehicle is running on the basis of a plurality of kinds of running state data relating to the running of the present vehicle;
acquiring weather information including at least one of rainfall information representing a measured rainfall amount in a region in which the present vehicle is running, or rainfall estimation information representing an estimated rainfall amount; and
identifying flooding of the road by using the detection result and the weather information,
wherein the detection result is acquired by comparing a predicted vehicle speed at a time after a predetermined time period from a given time with a measured vehicle speed at the time after the predetermined time period from the given time, the predicted vehicle speed being calculated based on the running state data at the given time, and
wherein the detection result indicates that the road is flooding in an area where a difference between the predicted vehicle speed and the measured vehicle speed continues to be at least a predetermined threshold for a predetermined duration.

13. The flood detection method according to claim 12, wherein the acquiring of the detection result comprises:
detecting a plurality of kinds of running state data relating to running of a vehicle among a plurality of vehicles;
acquiring the detected plurality of kinds of running state data from the plurality of vehicles;
deriving a vehicle movement model that finds a physical quantity that changes in accordance with running of the vehicle, by using the plurality of kinds of running state data acquired from the plurality of vehicles at a previous time, and a pre-specified learning model; and
detecting flooding of a road on which the present vehicle is running, by using the derived vehicle movement model and the plurality of kinds of running state data acquired from the present vehicle at the given time to obtain the predicted vehicle speed at the time after the predetermined time period from the given time, and comparing the predicted vehicle speed with the measured vehicle speed obtained from the running state data acquired from the present vehicle at the time after the predetermined time period from the given time.

* * * * *